(12) United States Patent
Johnson et al.

(10) Patent No.: US 11,645,248 B1
(45) Date of Patent: May 9, 2023

(54) OPTIMIZED DATA MIGRATION APPLICATION FOR DATABASE COMPLIANT DATA EXTRACTION, LOADING AND TRANSFORMATION

(71) Applicant: International Business Machines Corporation, Armonk, NY (US)

(72) Inventors: Rob K. Johnson, Sharpsburg, GA (US); Kenneth C. Barnett, Birmingham, AL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/221,877

(22) Filed: Apr. 5, 2021

Related U.S. Application Data (63) Continuation of application No. 16/506,884, filed on Jul. 9, 2019, now abandoned, which is a continuation of application No. 14/210,957, filed on Mar. 14, 2014, now Pat. No. 10,346,374.

(51) Int. Cl.
*G06F 16/21* (2019.01)

(52) U.S. Cl.
CPC .................. *G06F 16/214* (2019.01)

(58) Field of Classification Search
None
See application file for complete search history.

(56) References Cited

U.S. PATENT DOCUMENTS

| | | | |
|---|---|---|---|
| 7,548,898 B1* | 6/2009 | Tarenskeen | G06F 16/214 |
| 7,702,698 B1 | 4/2010 | Chakravarthy | |
| 8,782,101 B1 | 7/2014 | Moore | |
| 8,862,547 B2 | 10/2014 | Kramer et al. | |
| 2003/0177146 A1 | 9/2003 | Zimowski | |
| 2004/0122865 A1 | 6/2004 | Stahl et al. | |
| 2005/0228728 A1 | 10/2005 | Stromquist et al. | |
| 2005/0251533 A1 | 11/2005 | Harken et al. | |
| 2008/0168082 A1 | 7/2008 | Jin et al. | |
| 2009/0077014 A1* | 3/2009 | Zachariah | G06F 16/214 707/999.005 |
| 2010/0205189 A1 | 8/2010 | Ebrahimi et al. | |
| 2011/0040737 A1 | 2/2011 | Guldner et al. | |
| 2011/0227754 A1* | 9/2011 | Hill | G06F 16/24556 340/870.01 |
| 2011/0295795 A1* | 12/2011 | Venkatasubramanian | G06F 16/254 707/602 |
| 2013/0055197 A1 | 2/2013 | Balan et al. | |
| 2014/0172850 A1* | 6/2014 | Borkar | G06F 16/288 707/736 |
| 2014/0279890 A1* | 9/2014 | Srinivasan | G06F 16/254 707/626 |
| 2015/0026136 A1* | 1/2015 | Rathod | G06F 16/122 707/692 |
| 2015/0052157 A1 | 2/2015 | Thompson | |
| 2015/0074149 A1 | 3/2015 | Berns et al. | |

* cited by examiner

*Primary Examiner* — Christopher J Raab (57) ABSTRACT

Data migration of large volumes can require large memory requirements and knowledge of complicated data migration tools. In one example, a data migration application may be initiated and a data volume may be identified to migrate from a source database to a destination database. The process may include deleting data currently stored in a staging table of the destination database, and transmitting the data volume from the source database to the staging table stored in the destination database.

20 Claims, 9 Drawing Sheets

OPTIMIZED DATA MIGRATION APPLICATION FOR DATABASE COMPLIANT DATA EXTRACTION, LOADING AND TRANSFORMATION

CROSS-REFERENCE TO RELATED APPLICATIONS

This application is a continuation of U.S. patent application Ser. No. 16/506,884, filed on Jul. 9, 2019, which is a continuation of U.S. patent application Ser. No. 14/210,957, filed on Mar. 14, 2014, now U.S. Pat. No. 10,346,374, issued on Jul. 9, 2019, the entire disclosures of which are incorporated by reference herein.

TECHNICAL FIELD OF THE APPLICATION

This application relates to extracting, loading and transforming data for a proprietary database application, and more particularly, automating various data migration operations and related data preparation and bulk loading procedures.

BACKGROUND OF THE APPLICATION

Conventionally, in a data storage environment the data management tools used to load and transform large volumes of data for a target database are complicated and require certain expertise. This in turn causes delays when large data volumes are expected to be migrated to a database server or comparable network device.

Most data management systems currently available on the market today perform a three-part operation including the extraction, transformation and loading (ETL) of data. The ETL tools design a user interface that permits the user to create a process map to copy data from a source, transform that data, and then load the data to a destination. The map is saved and is loaded on a server that runs the map and performs processes included on the map. Users have to become experts in the ETL user interface to accomplish medium to complex data transformations and as a result each ETL system has a different interface.

Conventional data migration applications may move source data twice, such as in ETL tools like SSIS, which can be costly when loading large amounts of data. In addition, in ETL tools the data has to be moved from the destination database to the executing server in order to compare it to the source data in memory so that proper data transformations can be made. This results in large amounts of data being moved from server to server.

SUMMARY OF THE APPLICATION

One example embodiment may provide a method that includes initiating a data migration application, identifying a data volume to migrate from a source database to a destination database, deleting data currently stored in at least one staging table of the destination database, and transmitting the data volume from the source database to the at least one staging table stored in the destination database.

Another example embodiment may include an apparatus that provides a processor configured to initiate a data migration application, identify a data volume to migrate from a source database to a destination database, delete data currently stored in at least one staging table of the destination database, and a transmitter configured to transmit the data volume from the source database to the at least one staging table stored in the destination database.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, large volumes of data may be loaded and transformed from a variety of third party proprietary data formats and sources into a target database or data warehouse utilizing only one type of data storage format and/or statements, (e.g., SQL® statements, ORACLE® statements, etc.). In one example, SQL is a well-known language common to almost all data developers and databases. The setup to load and transform data via a sport data integrator application (SDI) according to example embodiments may be performed in a matter of minutes. The SDI's functionality is enabled by a two-stage data preparation and transformation application system, which requires the users of such an application to enable statements for loading and transforming data from one system to another system, as opposed to learning a new tool of a specific proprietary application and working only within its limitations and requirements. The SDI's unique standardized operation results in optimized data management when managing large volumes of source data.

Figure 1:
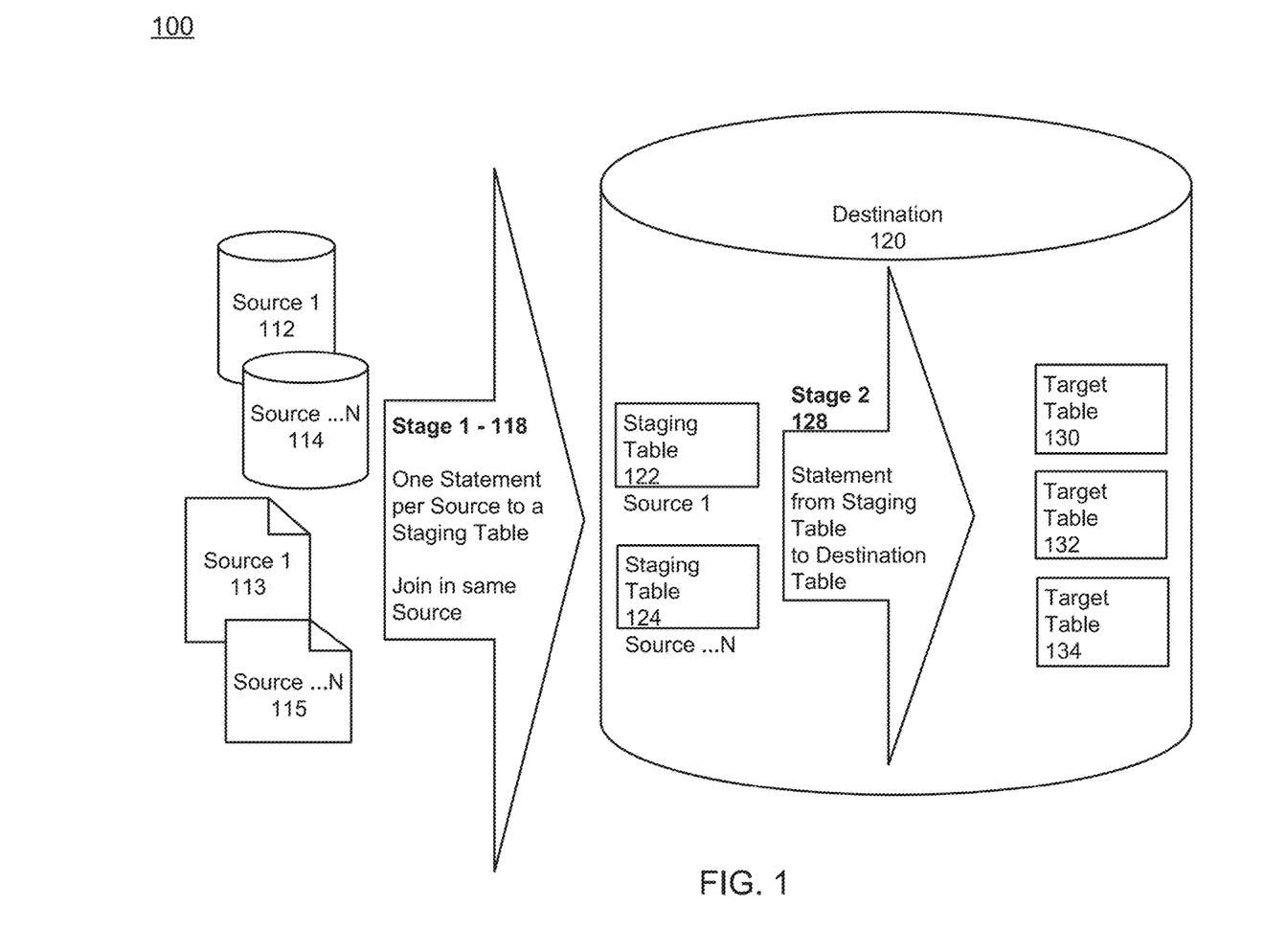
FIG. 1 illustrates an example data migration logic diagram according to example embodiments of the present application.

FIG. 1 illustrates an example data migration logic diagram according to example embodiments of the present application. Referring to FIG. 1, the data flow logic diagram 100 includes two stages of data processing and migration. The first stage 118 of the SDI data processing application is referred to as the bulk loading stage, which moves data from one or more source databases 112 and 114 (1 ... N) and/or corresponding data files 113 and 115 (1 ... N) to a destination database 120 by moving the results of a query on the source data directly into the destination database. The data stored in source tables and/or files is filtered before it is copied to the destination database. The tables where the data is stored in the destination database are designated as staging tables 122 and 124 (1 ... N) depending on the data sources. A staging table 122/124 may be a copy, in terms of the columns, rows format, etc., of the source table\file, or it may contain only a subset of the source columns. A source column that exists in the staging tables 122/124 mimics the data source at least in terms of its name and data type.

In operation, when attempting to perform a bulk load data migration, a statement (i.e., SQL statement) may be specified to retrieve the data from the source database or file and then the SDI application will then move the data to the destination staging tables. The data in the destination staging tables 122/124 is then deleted thereafter each time before data is copied from the data source to the destination database. In the second stage of the SDI data processing procedure 128, data is transformed and moved within the destination database 120 from the staging tables 122/124 to the relevant target tables 130-134. This second stage 128 may be referred to as the transformation stage as the database structure statements are used to transform the data between the staging tables 122/124 and the relevant target tables 130-134. The statements apply a series of rules or functions (i.e., transformations) to a set of the staged data while loading the data into the target tables, resulting in an optimized set of data transforming and moving operations.

The frequency of operations used for both the two SDI data processing stages is controlled by a scheduling application operating within the SDI framework. The SDI application utilizes a job which may include any number of stages including one or more stage 1 and/or stage 2 tasks. Each job is setup within the SDI application to run on a schedule, where a schedule can be defined as either a fixed interval, daily, weekly, monthly, etc. The SDI application tracks each job run (i.e., execution) and whether or not the job run was completed successfully. If a run is not successful, the SDI application will indicate that the data was not retrieved and will attempt to retrieve it on the next run. As a result, the user account associated with the application use may receive instant status emails on all failures. The user interface may permit custom reports to be generated to determine any errors or the health and responsiveness for each job and the tasks (e.g., bulk load or transformation) within each job. The SDI application logs the result of every task on every job in the destination database. It also provides reports that can be filtered and sorted to allow the developer to quickly analyze the results of the jobs in order to view performance metrics and debugging details. The SDI application also provides a user-configurable, automated clean-up mechanism for the log data so that it does not grow too large.

The creation and maintenance of the structure of the staging tables can be performed manually or automatically by the SDI application, which permits the SDI application to work with various database security schemes. In manual mode, the staging tables 122/124 should be created in the destination database 120 by a developer with appropriate permissions. In automatic mode, the SDI application will dynamically create the staging tables based on a definition in the source database or data file(s). In this mode of operation, each time a bulk load job is performed, the SDI application will dynamically create or modify the staging tables 122/124 to keep their structure in synchronization with the corresponding source tables or files structures.

Figure 2:
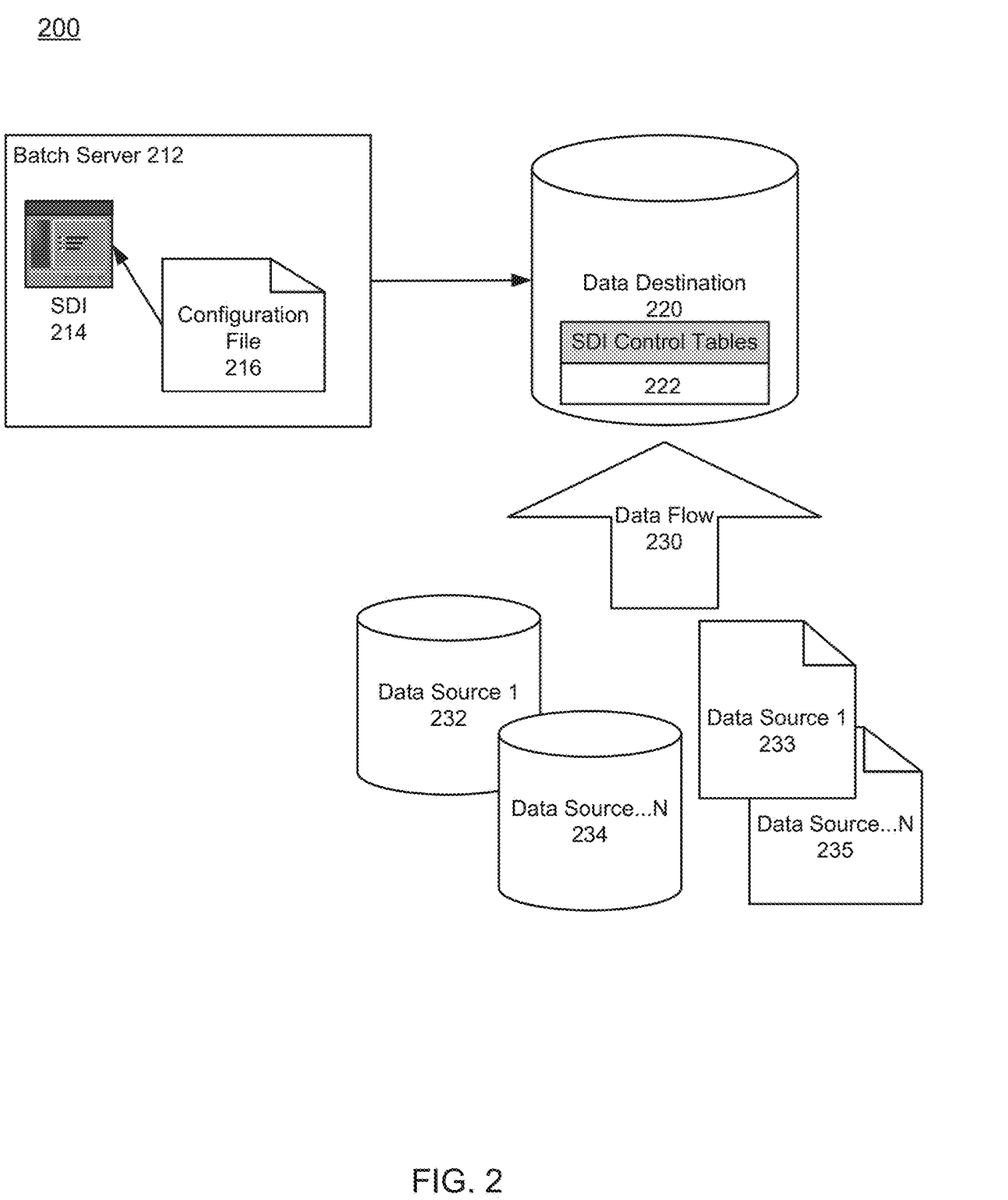
FIG. 2 illustrates an example batch server data file configuration according to example embodiments of the present application.

FIG. 2 illustrates an example batch server data file configuration according to example embodiments of the present application. Referring to FIG. 2, the logic diagram 200 includes a destination database 220, which can be any ODBC-compliant database, which includes all of the most popular databases such as ORACLE, SQL SERVER, DB2, SYBASE, MYSQL, and INFORMIX. The SDI application is optimized for bulk loading when the destination database is ORACLE OR SQL SERVER. The SDI application provides for a flexible extract\load\transform process. The source data can be manipulated during a bulk loading operation from the data source and/or after the data is in the destination database 220 during the transformation phase. All data does not have to be brought over from the source at the onset of the bulk load operation. The database application being used can be altered instantly by altering a bulk load statement that queries the data source. The statement for the source database can also include join links or pointers to other tables in the source database to narrow the specific rows copied to the destination database.

In FIG. 2, the batch server 212 includes a SDI application or module 214 that processes batch data migration efforts based on a schedule. The configuration file 216 provides a location of the destination database to instruct the batch process being performed to the correct location. The data destination database 220 may then identify certain SDI control tables 222 as location where the data is going to being migrated. The SDI tables are utilized during the processing of the data extraction, loading, and transformation. This is often referred to as a database, data warehouse, or data hub. The SDI control tables manage the SDI processes and log history. The SDI control tables do not have to be stored in the destination database, and can instead be stored in a separate database. In operation, the data source databases 232/234 is the initial source of data from which the migration is taking place. The data source files 233 and 235 (1 ... N) are the initial sources of data from which the migration is taking place. The data flow 230 includes the data source data and the data source structures 232 and 234 (1 ... N).

The SDI application executes jobs in synchronous or asynchronous mode. In the synchronous mode of operation, the jobs run serially one job at a time, which provides that there is the potential for a job not to run at a designated time if a previous job is running longer than expected. If the SDI application is operating in asynchronous mode, then multiple (one or more) jobs will process at the same time. The asynchronous capabilities are accomplished via multi-threading within an SDI engine. Performing multiple jobs at one time may result in additional complexities if the same data is potentially being updated by each job, so the SDI application supports either mode in order to provide the desired functionality for a given implementation.

The SDI application contains a graphical user interface (GUI) for entering and maintaining the bulk load and transforming SQL statements as well as scheduling information about the jobs. The interface also provides for extensive reporting on the logging data in order to debug issues and observe detailed performance metrics. The SDI application is an ELT extract, load and transform tool. Most conventional tools used today are based on the ETL approach. Some of the more common ETL tools available today are SQL Server integration services (SSIS) by MICROSOFT, Oracle Warehouse Builder (OWB) and Oracle Data Integrator (ODI) by ORACLE, Data Services by SAP Business Objects, and IBM Information Server (DATASTAGE) by IBM, SAS data integration studio by SAS Institute, and POWERCENTER by INFORMATICA. The SDI application differentiates itself from other ETL tools on the basis of efficiency and flexibility. SDI's bulk loading processes are separate from the transformation process, which in turn allows the SDI application to load the entire source data which may be required in the future. Since the loading process and the transformation process are separate, SDI can break down all of the processes into smaller more predictable and manageable processes. This permits users to experience a more structured approach to data storage. It also permits the transformation process to be performed by utilizing efficient set-based SQL statements within the destination data warehouse, which provides a significant advantage in terms of performance and simplicity. The SDI application also tracks all data loads from the source. The data gathering is set to a schedule and the SDI application tracks the history of the loads. If the latest load was not successfully performed for any reason, the SDI application would rectify the error on the next scheduled load. Upon this indication, the SDI application would load both the new data and "missed" data from the previous 'defective' run. Most other tools would not automatically perform such operations. The user would have to check the logs and perform manual maintenance to gather the "missed" data.

Figure 3:
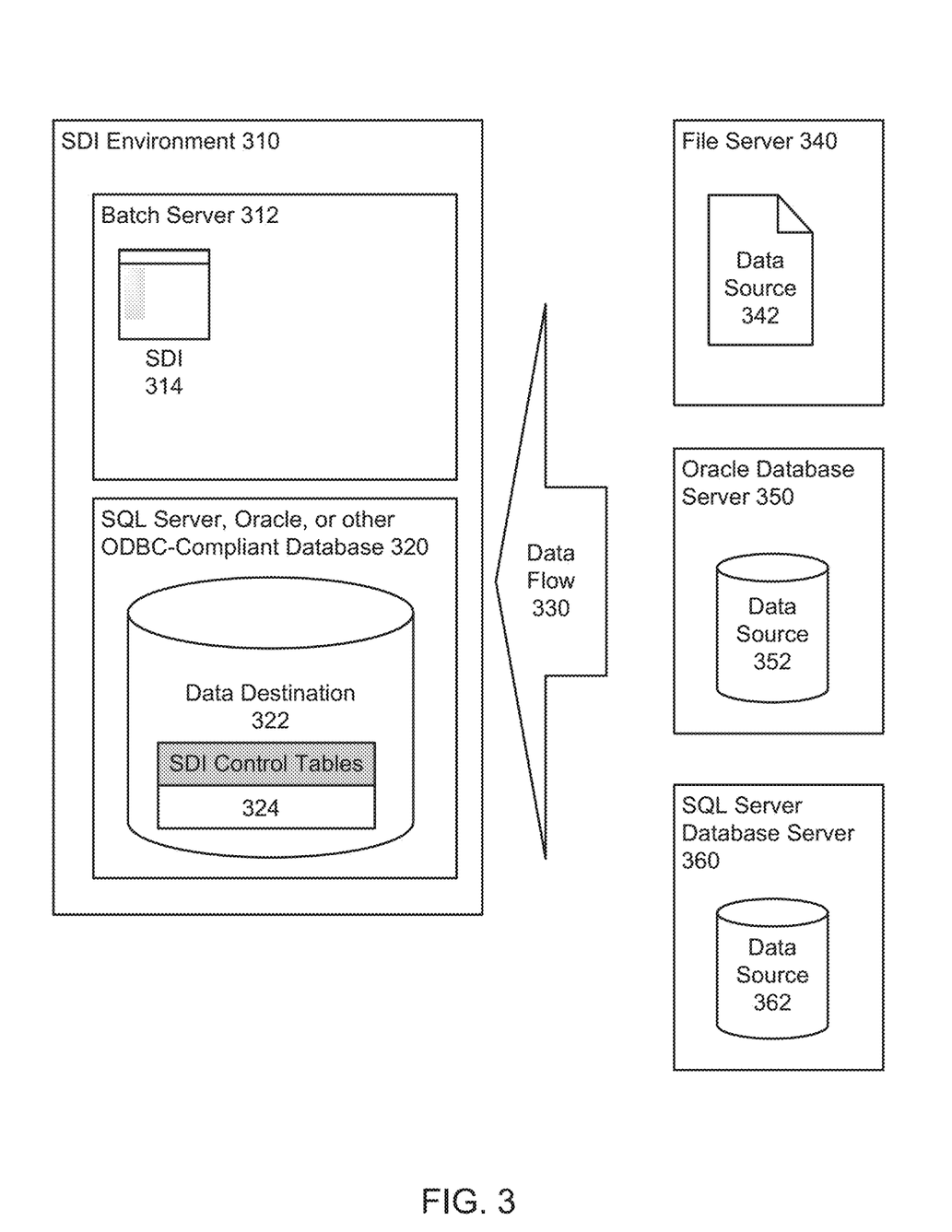
FIG. 3 illustrates an example data flow logic diagram configuration according to example embodiments of the present application.

FIG. 3 illustrates an example data flow logic diagram configuration according to example embodiments of the present application. Referring to FIG. 3, the SDI application runs processes based on a schedule. The logic diagram 300 includes an SDI application environment 310 with a batch server 312 used to host the SDI application 314 and a compliant database 320 with a data destination database 322 with a location where the data is being migrated. This database 320 also includes the SDI control tables 324 which are utilized during the processing of the data extraction, loading, and transformation, which is also referred to as a database, data warehouse, or data hub.

The SDI control tables are used to manage the SDI processes and log history and may be referenced to update the procedure history or reference to retrieve known processes or log data. The data source database is an initial source of data from which the migration is being performed. The data source file 342 may be provided from a file server 340. The data flow 330 of data would originate from a data source 352 of an oracle database server 350 and/or a data source 362 of a SQL server database server 360. However, other database sources may be used to include other types of database applications and formats. The initial sources of data from which the migration is taking place.

Figure 4:
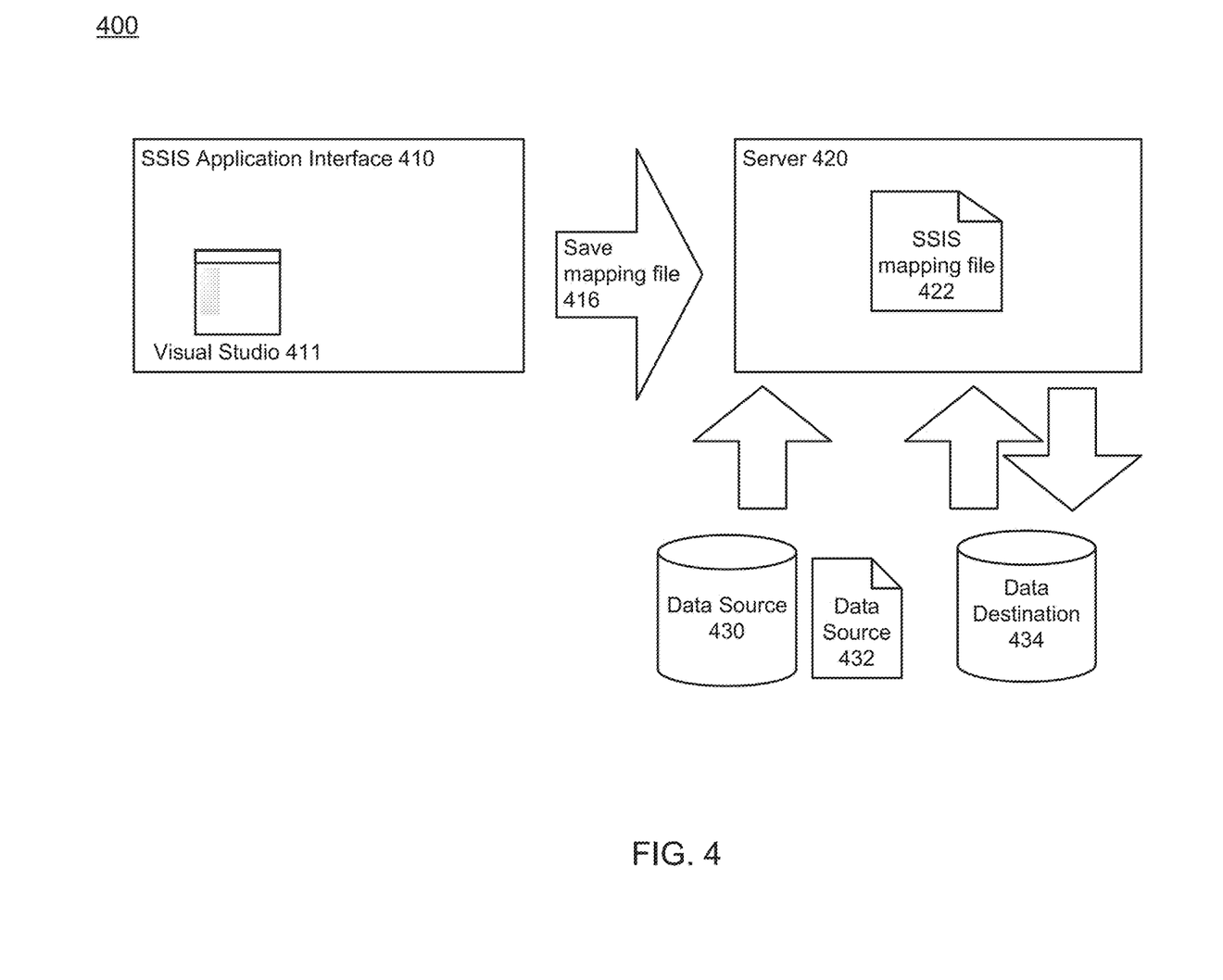
FIG. 4 illustrates an example application interface and data mapping operation according to example embodiments of the present application.

FIG. 4 illustrates an example application interface according to example embodiments of the present application. Referring to FIG. 4, the data logic configuration 400 includes a SQL server integration services (SSIS) interface 410 which may operate a visual studio interface 411. In operation, the user may create a data process map and load a map file 422 into the SSIS that runs on the server 420. The SSIS 410 may move data from the source and the destination into memory on the server 420 on which it runs. The SSIS application may transform the data on the server 420 while it is still in memory and then moves the data to the destination database 434 while saving the mapping file 416.

Conventional data migration applications may move data more than once. The SDI application moves the source data once, which results in significant performance gains when compared to standard ETL tools. To enable good performance from an ETL tool, a large storage server with large amounts of memory and CPUs must be utilized because of the transformation process. In comparison, the SDI application only requires a normal-sized server to run optimally. The SDI application data transformation process is operated on the database server which is already a large server for both the SDI and ETL architectures.

In the example of FIG. 4, the user would not have to learn a new interface application and language to create a process map for the SDI application. The SDI application uses standard statement types that all users must know to transform any data manipulation in a database. The SDI only requires two statements to copy data from a source, transform that data, and then load the data to a destination. Large quantities of data can be moved and transformed into a table within minutes with the SDI application. A typical ETL tool can take hours to create a process map for each of the tables being moved to the destination, which could take days or weeks. The benefit to cost ratio for conventional ETL tools can drop significantly if managing multiple source files or tables. To the contrary, the SDI application benefit to cost ratio increases every time a source file or table is added. The SSIS mapping file 422 receives the mapping file 416 and stores the data in a data destination 434 according to the mapping data. The data source 430 may provide a data source file 432 which is converted to data storage according to the SSIS mapping file 422.

Figure 5:
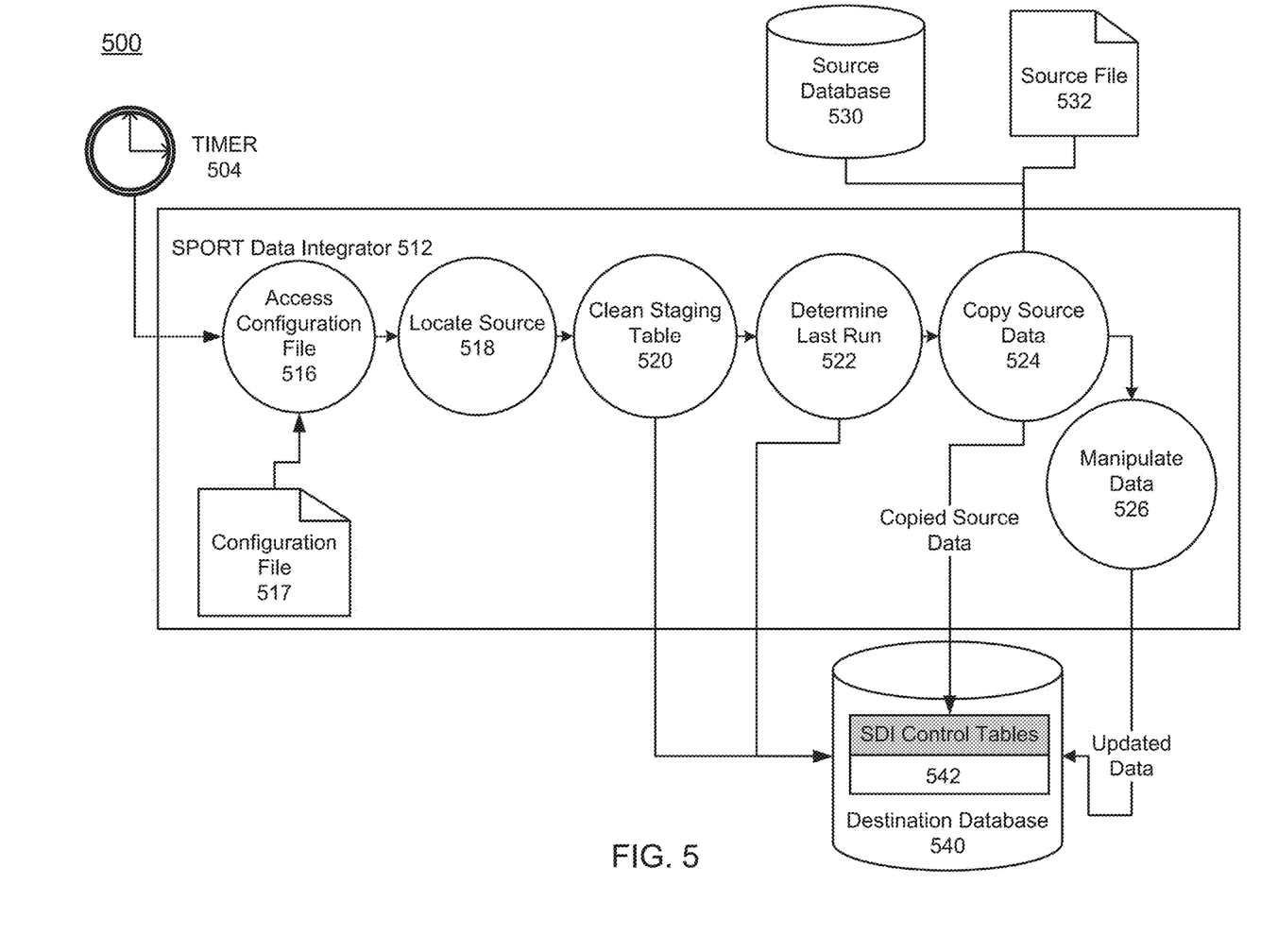
FIG. 5 illustrates an example data integration flow diagram configuration according to example embodiments of the present application.

FIG. 5 illustrates an example data integration flow diagram configuration according to example embodiments of the present application. Referring to FIG. 5, the data flow diagram 500 includes a schedule or timer 502 which may be used to activate a job to run based on the job schedule. SDI application 512 may access a configuration file 517 to initiate the SDI integrator batch process. The access configuration file 516 may be read to determine the location of the destination database 540. The source data 532 and database 530 will be referenced within the SDI control tables of the destination database. The locate source operation 518 may be used to identify the location of the source database 530 for the upcoming copying of the source data. The clean staging table 520 is a temporary storage for the copied source data. Each time the SDI application runs, the staging table is emptied so that only the newly copied data will occupy the staging table and ultimately be added to the destination database 540. The 'determine last run' operation 522 may be used so the SDI application can determine if a previous job failed or did not receive the required data. If the previous job did fail, the SDI application will gather the current data and the data for the unsuccessful job. If the previous run did not fail, the SDI application will only gather the current required data. The 'copy source data' operation 524 is used to retrieve the source data, based on a pre-defined statement, which is then copied and added to the staging table 542. The 'Manipulate Data' operation 526 is used to manipulate the data based on pre-determined criteria and to copy the data to the final destination table(s) in the destination database 540. The configuration file 517 may be used to provide the location of the destination database and to point the batch process to the correct location. The data destination database 540 is a location where the data will be migrated. This location also holds the SDI tables 542 that are utilized during the processing of the data extraction, loading, and translation.

The database 540 may also be referred to as a destination database, data warehouse, or data hub. The SDI control tables 542 manage the SDI processes and log history usage information. The data source database 530 is the initial source of data from which the migration is taking place and the data source file 532 is the initial source of data from which the migration is taking place.

Figure 6:
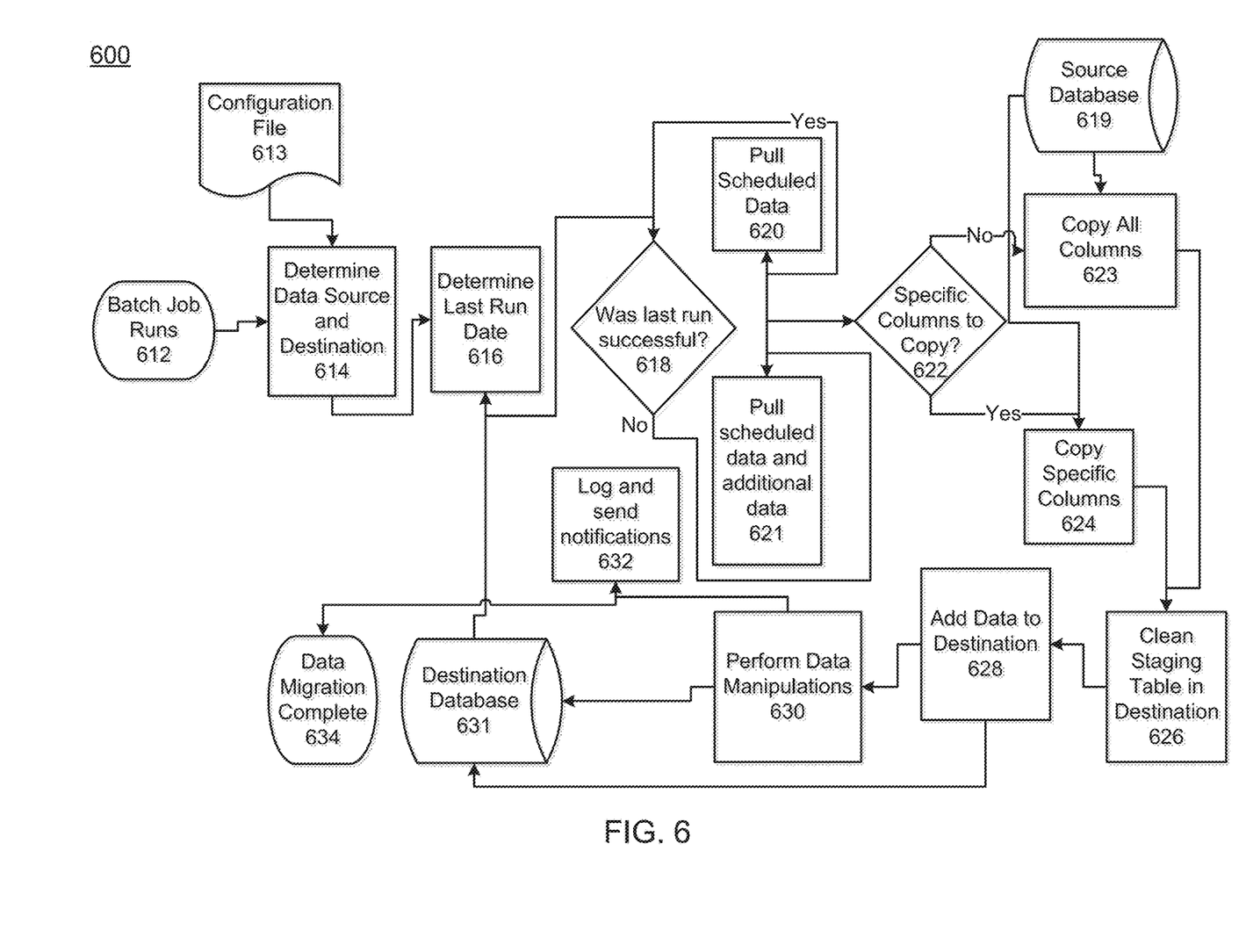
FIG. 6 illustrates an example logic flow diagram according to example embodiments of the present application.

FIG. 6 illustrates an example logic flow diagram according to example embodiments of the present application. Referring to FIG. 6, assuming the schedule is set for data migration, the process 600 may provide determining that a data source and destination 614 are ready for migration. The SDI application may begin to run and read a configuration file 613 to identify a location of the destination database. The source database location can be determined within the SDI control tables, which reside in the destination database 631.

A determination may be made to identify a "Last Run" 616 by reading the job history for the SDI processing to determine the last successful run. The scheduled data of the batch job runs 612 can be accessed to determine if all past runs were successful, and the SDI application may only gather data for the current run. The scheduled data and additional data may be accessed 620 to identify if the last run was successful 618. If not, then additional data may be pulled 621, such as the current run's data and data that should have been gathered in the past unsuccessful runs. If the user did not specify 622 in the criteria to only pull certain data columns, all data columns will be copied 623 from the source database 619 to the destination database 631. If the user did specify in the criteria to only pull certain data columns 624, the specified data columns will be copied to the destination database 631.

The staging table, which is used as temporary storage in the destination database may be cleaned 626 before the source data is copied to the staging table and data may be added to the destination 628. The specified data is then copied to the staging table, and data manipulations 630 are performed as the data is copied from the staging table to the specified destination table(s) within the destination database 631. The operation procedure is logged and any notifications are sent 632 to inform users that the job failed and its specific errors will be noted and may be part of the transmitted notification. The data migration is then said to be complete 634 and the operation is finished.

An example of a bulk load SQL statement may include,
SELECT PC.*
FROM MAXIMO.PO PO
INNER JOIN MAXIMO.POCOST PC ON
PO.PONUM=PO.PONUM
AND
PO.ORGID=PC.ORGID
WHERE PC.ORGID< >'SNC' AND PO.CHANGE-DATE>:BufferDate.

Each job that is executed by the SDI application can have '0' or more "bulk load" tasks. The above SQL statement is an example of a bulk load task within the SDI. The SDI application will execute this SQL statement against the source database and then load the resulting dataset into a staging table in the destination database. In this example, the destination staging table that the control tables specify for this task is called SMAX_POCOST. Any data that was in the staging table is deleted before the SDI loads it with the data from the source. All of the procedures are performed in one step for the bulk load.

The statements apply a series of rules or functions (i.e., transformations) to a set of the staged data while loading the data into the target tables. This approach provides a set-based way to move and transform the data, which is efficient when compared with other methodologies. It also utilizes the SQL language which is common to all database developers. This approach can also be 'debugged' easier than other conventional approaches.

In FIG. 1, there are two staging tables for three targets, the staging and destination tables do not have to exist in a one-to-one relationship. A source system may combine employee and address information in one table. The SDI would retrieve such data and transform the data into one staging table, and then the SQL transformation could split these two concepts in the destination target tables. Likewise, a source system could have a separate employee and address table. The SDI would retrieve those tables as two staging tables, and then the SQL transformation could combine the two tables into one target destination table. It remains flexible so the design of the destination data model can be specified by the developer.

Each bulk SQL statement specifies a set of columns\fields to select from the source system. When the SDI executes this statement against the source, it receives the data in those columns\fields along with a set of meta-data that describes the data-type of each column\field. Based on that meta-data, the SDI can create the staging table with matching columns within the destination database. The SDI will automatically create the staging table if it is operating in an automatic mode and if the staging table does not already exist within the destination database.

The control tables may include a job table which is a table that lists the jobs that are to be executed by the SDI on some schedule. The bulk load task table lists the bulk load tasks for each job. The source table lists the source connection information associated with each bulk load task. The schedule table lists the execution schedule for each job. The transformation task table lists the transformation tasks for each job. The job log table stores the log information associated with each job. The job task log table stores the log information associated with each task on a job. These control tables can exist in a different database than the destination database(s).

The SDI uses two types of tasks to accomplish a job. The first is a bulk load task. This type of task is what accomplishes the copy and load functionality referenced in your question. The SDI extracts and loads the data from the source system into the destination staging tables based on the bulk load SQL statement. The second is a SQL transformation task. This type of task is what provides for the transformation of the data while the data is being moved from the staging tables into the target destination tables. Some transformation may be incorporated into both types of tasks, depending on how the developer designs the SQL, but the SDI is designed for the transformations to typically occur in the second type of tasks.

Figure 7:
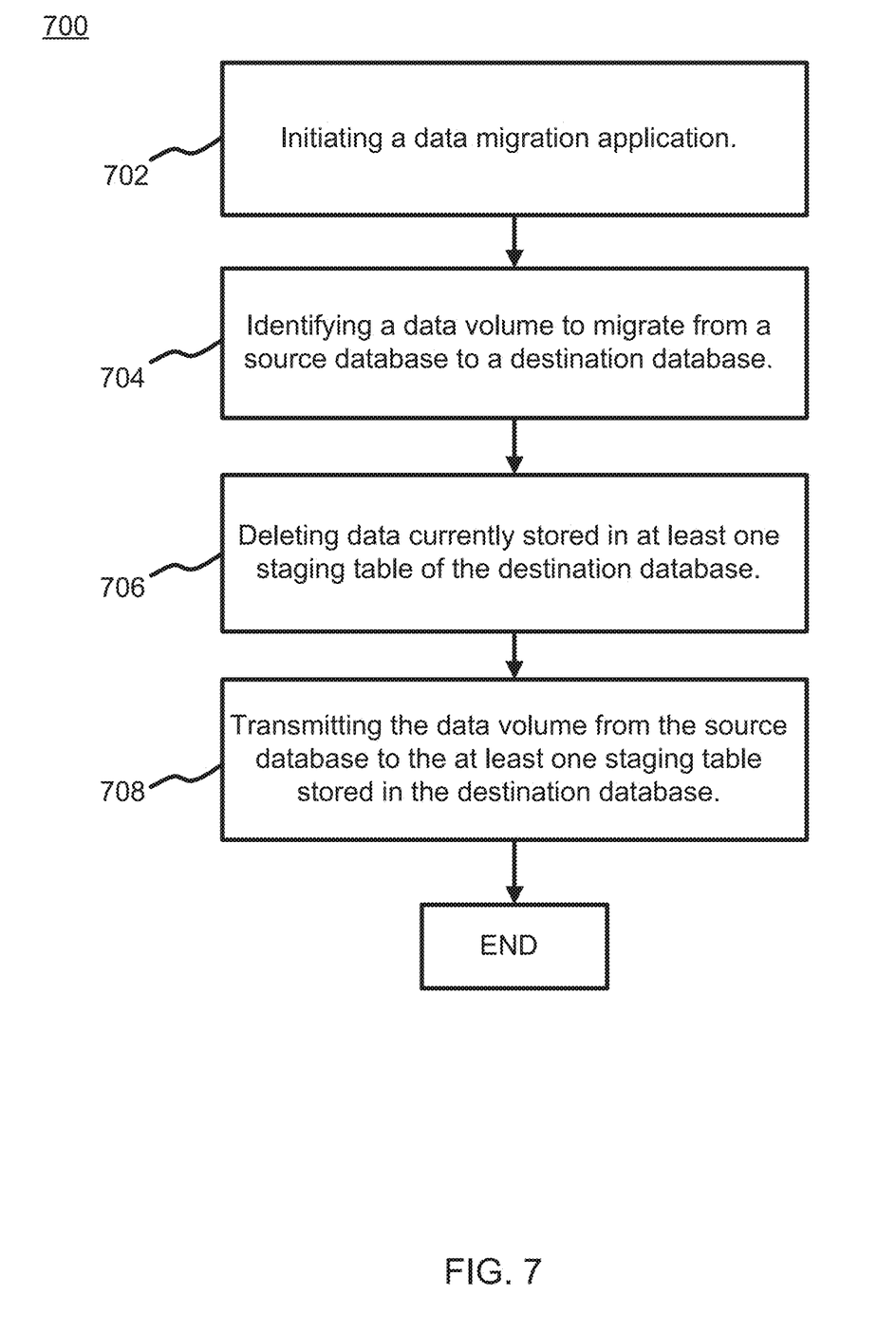
FIG. 7 illustrates an example system communication signaling configuration of the data migration operations according to example embodiments of the present application.

FIG. 7 illustrates an example method of operation. Referring to FIG. 7, the method may include initiating a data migration application at operation 702 and identifying a data volume to migrate from a source database to a destination database at operation 704. The method may also include deleting data currently stored in at least one staging table of the destination database at operation 706 and transmitting the data volume from the source database to the at least one staging table stored in the destination database at operation 708.

Figure 8:
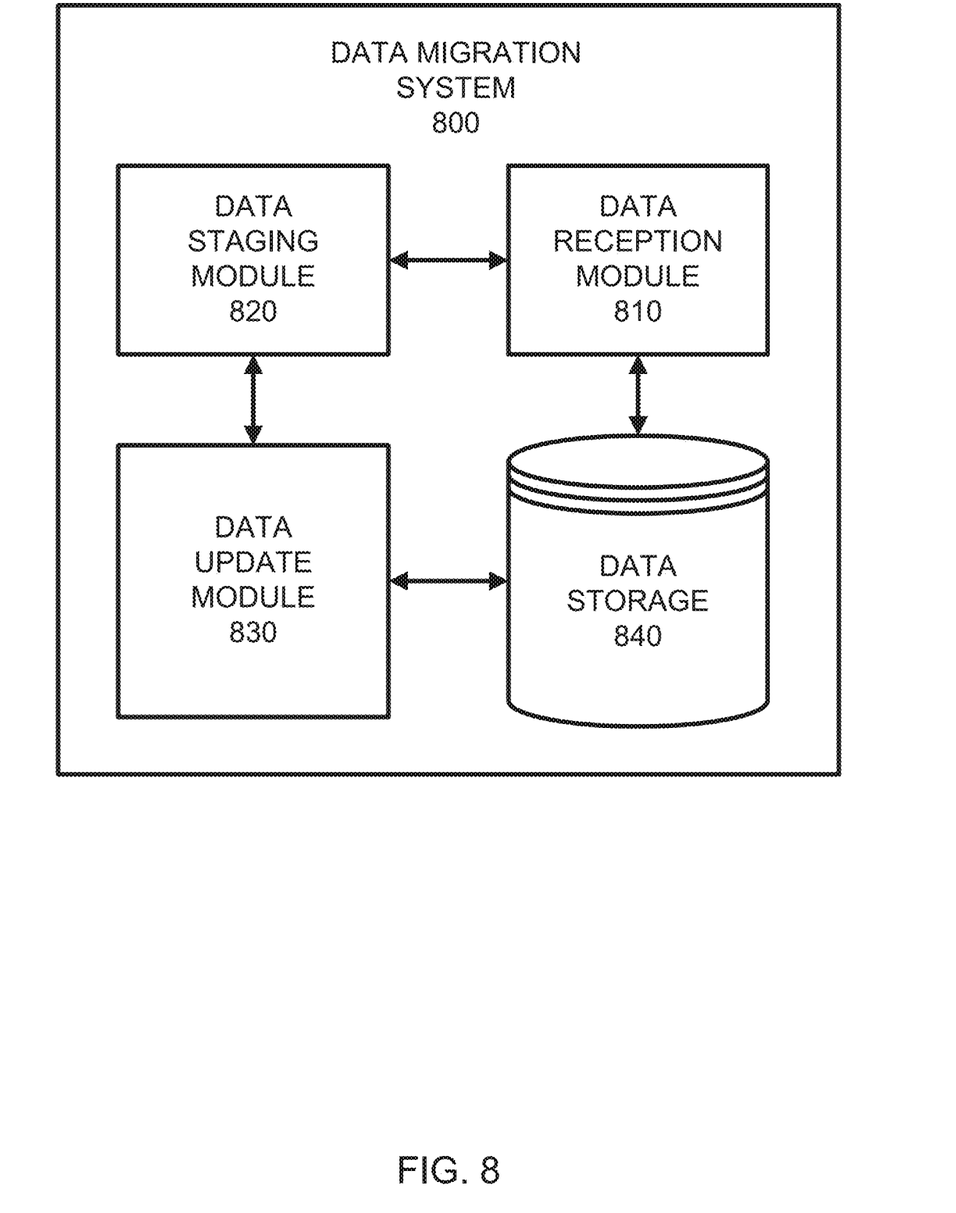
FIG. 8 illustrates an example flow diagram according to example embodiments of the present application.

FIG. 8 illustrates an example system communication signaling configuration of the data migration operations according to example embodiments of the present application. Referring to FIG. 8, the data migration system 800 may be one or more separate devices with one or more modules operating as hardware/software configured to perform operations according to example embodiments. Referring to FIG. 8, the data reception module 810 may receive a selection to initiate a data migration application, and identify a data volume(s) to migrate from a source database to a destination database. In one example, the invocation of such a data migration effort may provide deleting data currently stored in at least one staging table of the destination database, and transmitting the data volume from the source database to the at least one staging table stored in the destination database. The data staging module 820 may identify a data volume transmitted from a source database 840 and transmit results from a query operation result performed on the source database. The staging module 820 may also filter the data volume in the source database prior to transmitting the data volume to the destination database. The data volume is stored in source tables of the source database and the staging table may have a same name and data type as a name and data type of the source table.

In addition, the data update module 830 may retrieve a configuration file, locate at least one data source associated with the data volume, identify the staging table as having a particular format, and convert a data format of the data source into a format of the staging table. When performing a migration, data from a last run may be accessed from the configuration file and used to perform the data migration. The migration system 800 may also include migrating the data volume as at least two source tables into at least two corresponding staging tables, and converting the data stored in the two staging tables into one destination table.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 9 illustrates an example network element 900, which may represent any of the above-described network components, etc.

Figure 9:
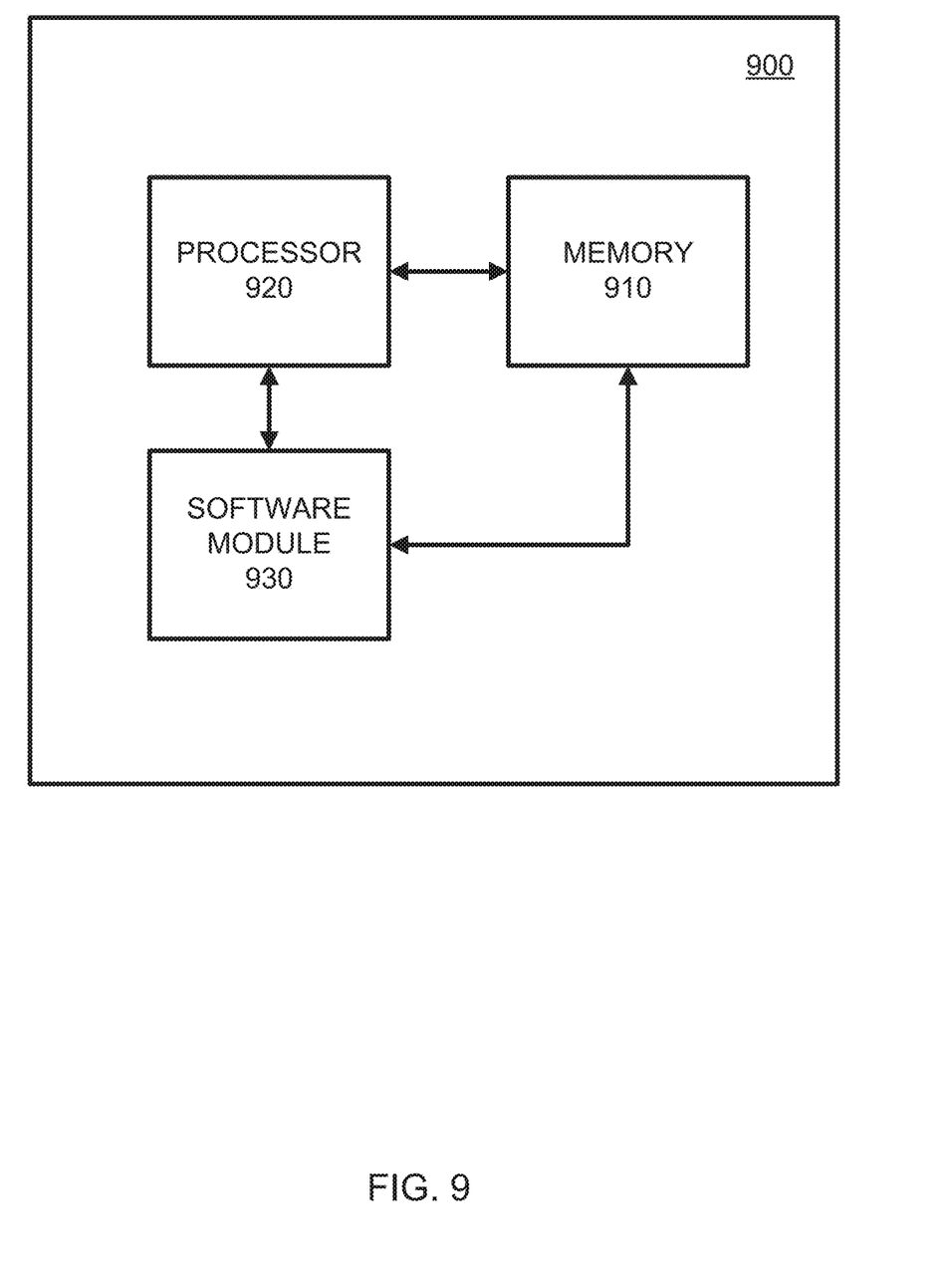
FIG. 9 illustrates an example network entity device configured to store instructions, software, and corresponding hardware for executing the same, according to example embodiments of the present application.

As illustrated in FIG. 9, a memory 910 and a processor 920 may be discrete components of the network entity 900 that are used to execute an application or set of operations. The application may be coded in software in a computer language understood by the processor 920, and stored in a computer readable medium, such as, the memory 910. The computer readable medium may be a non-transitory computer readable medium that includes tangible hardware components in addition to software stored in memory. Furthermore, a software module 930 may be another discrete entity that is part of the network entity 900, and which contains software instructions that may be executed by the processor 920. In addition to the above noted components of the network entity 900, the network entity 900 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 8 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    copying, from a source database to at least one staging table stored in a destination database, a data volume using an extract, transform, and load (ETL) data migration operation, wherein the copying comprises modifying the at least one staging table such that a structural format of the at least one staging table is in synchronization with a structural format of the copied data volume;
    transferring the data volume from the at least one staging table to at least one target table in the destination database; and
    converting a structural format of the data volume from a structural format of the source database to a structural format of the destination database that is different from the structural format of the source database using an ETL transformation.

2. The method of claim 1, further comprising:
    filtering the data volume in the source database prior to copying the data volume to the destination database.

3. The method of claim 1, wherein the data volume is stored in source tables of the source database, and
    wherein the at least one staging table has a same name and data type as a name and data type of the source table.

4. The method of claim 1, further comprising:
    accessing a configuration file to locate at least one data source associated with the data volume;
    identifying the at least one staging table; and
    determining a location of the destination database.

5. The method of claim 4, further comprising:
    identifying last run information from the configuration file; and
    performing the ETL data migration operation based on the last run information.

6. The method of claim 1, wherein the copying comprises:
    migrating the data volume as at least two source tables into at least two corresponding staging tables; and
    converting the data stored in the two staging tables into one destination table.

7. The method of claim 1, wherein only two statements are required for the copying, the converting, and the transferring, and
    wherein the at least one staging table is format agnostic.

8. The method of claim 1, wherein the method further comprises:
    determining that a previously scheduled ETL data migration operation for another data volume was unsuccessful; and
    in response, automatically copying, transferring, and converting the previously scheduled other data volume with the copying, transferring, and converting of the identified data volume of a current ETL data migration operation.

9. The method of claim 1, wherein the at least one staging table retains each of a row format, a column format, and a naming format of the copied data volume from any proprietary structural formats.

10. An apparatus comprising:
    a hardware-implemented processor that when executing one or instructions stored in memory is configured to:
        copy, from a source database to at least one staging table stored in a destination database, a data volume using an extract, transform, and load (ETL) data migration operation, wherein the copying comprises modifying the at least one staging table such that a structural format of the at least one staging table is in synchronization with a structural format of the copied data volume;
        transfer the data volume within the destination database from the at least one staging table to at least one target table in the destination database; and
        converting a structural format of the data volume from a structural format of the source database to a structural format of the destination database that is different from the structural format of the source database using an ETL transformation.

11. The apparatus of claim 10, wherein the processor is configured to copy the data volume in response to a query operation performed on the source database.

12. The apparatus of claim 10, wherein the processor is further configured to:
 filter filters the data volume in the source database prior to the copy of the data volume.

13. The apparatus of claim 10, wherein the data volume is stored in source tables of the source database, and
 wherein the at least one staging table has a same name and data type as a name and data type of the source table.

14. The apparatus of claim 10, wherein the processor is further configured to:
 access a configuration file to locate at least one data source associated with the data volume;
 identify the at least one staging table; and
 determine a location of the destination database.

15. The apparatus of claim 14, wherein the processor is further configured to:
 identify last run information from the configuration file, and
 perform the ETL data migration operation based on the last run information.

16. The apparatus of claim 10, wherein the processor is further configured to:
 migrate the data volume as at least two source tables into at least two corresponding staging tables; and
 convert the data stored in the two staging tables into one destination table.

17. A non-transitory computer readable storage medium storing one or more instructions that when executed by a processor cause the processor to perform:
 copying, from a source database to at least one staging table stored in a destination database, a data volume using an extract, transform, and load (ETL) data migration operation, wherein the copying comprises modifying the at least one staging table such that a structural format of the at least one staging table is in synchronization with a structural format of the copied data volume;
 transferring the data volume from the at least one staging table to at least one target table in the destination database; and
 converting a structural format of the data volume from a structural format of the source database to a structural format of the destination database that is different from the structural format of the source database using an ETL transformation.

18. The non-transitory computer readable storage medium of claim 17, wherein the one or more instructions further cause the processor to perform:
 filtering the data volume in the source database prior to the data volume being copied to the destination database.

19. The non-transitory computer readable storage medium of claim 17, wherein the data volume is stored in source tables of the source database, and
 wherein the at least one staging table has a same name and data type as a name and data type of the source table.

20. The non-transitory computer readable storage medium of claim 17, wherein the one or more instructions further cause the processor to perform:
 accessing a configuration file to locate at least one data source associated with the data volume;
 identifying the at least one staging table; and
 determining a location of the destination database.

* * * * *